US008462706B2

(12) United States Patent
Yoon et al.

(10) Patent No.: US 8,462,706 B2
(45) Date of Patent: Jun. 11, 2013

(54) METHOD FOR REQUESTING AND REPORTING CHANNEL QUALITY INFORMATION IN WIRELESS SYSTEM AND APPARATUS THEREOF

(75) Inventors: Chul-Sik Yoon, Daejeon (KR);
Jae-Heung Kim, Daejeon (KR);
Kun-Min Yeo, Daejeon (KR);
Soon-Yong Lim, Daejeon (KR);
Byung-Han Ryu, Daejeon (KR)

(73) Assignees: Electronics and Telecommunications Research Institute (KR); Samsung Electronics Co., Ltd (KR); KT Corporation (KR); SK Telecom Co., Ltd (KR); KTFreetel Co., Ltd (KR); Hanaro Telecom., Inc. (KR)

( * ) Notice: Subject to any disclaimer, the term of this patent is extended or adjusted under 35 U.S.C. 154(b) by 1213 days.

(21) Appl. No.: 10/588,480

(22) PCT Filed: Feb. 2, 2005

(86) PCT No.: PCT/KR2005/000313
§ 371 (c)(1),
(2), (4) Date: Apr. 9, 2008

(87) PCT Pub. No.: WO2005/072073
PCT Pub. Date: Aug. 11, 2005

(65) Prior Publication Data
US 2008/0287138 A1 Nov. 20, 2008

(30) Foreign Application Priority Data

Feb. 2, 2004 (KR) .................. 10-2004-0006574
Nov. 11, 2004 (KR) .................. 10-2004-0091824

(51) Int. Cl.
*H04W 4/00* (2009.01)
(52) U.S. Cl.
USPC .............. 370/329; 455/452.1; 455/452.2; 370/341
(58) Field of Classification Search
USPC ............. 455/452.1, 452.2; 371/329; 370/329
See application file for complete search history.

(56) References Cited

U.S. PATENT DOCUMENTS

| 7,124,350 B2* | 10/2006 | Chao et al. ............ 714/776 |
| 2004/0142698 A1* | 7/2004 | Pietraski ............ 455/452.2 |

(Continued)

FOREIGN PATENT DOCUMENTS

WO    WO 02/093961    11/2002

OTHER PUBLICATIONS

Noriyuki Fukui, Study of Channel Quality Feedback in UMTS HSDPA, The 14th IEEE 2003 International Symposium on Personal, Indoor and Mobile Radio Communication Proceedings, Sep. 2003, pp. 336-340.

(Continued)

*Primary Examiner* — Jinsong Hu
*Assistant Examiner* — Qun Shen
(74) *Attorney, Agent, or Firm* — The Farrell Law Firm, P.C.

(57) ABSTRACT

The subscriber station of claim 15, wherein the uplink data includes data to be transmitted, and a header having information on the data and the subscriber, and the uplink data generator adds the subheader includDisclosed is a method and device for requesting and reporting channel quality information in a mobile communication system. An uplink radio resource for a subscriber station having data to transmit is allocated and a CQI indicator for requesting channel quality information is added to the allocation information to be transmitted to a subscriber station. The subscriber station having received the uplink radio resource allocation information generates channel quality information by measuring the radio channel quality for communication with the base station according to existence of the indicator and transmits desired uplink data having the generated channel quality information to the base station. As a result, the seamless and efficient channel quality report can be performed in the wireless communication system, and the optical modulation and the channel coding level can be adapted for the subscriber to transmit or receive the data corresponding to the channel quality. ing the channel quality information to the header of the uplink data.

14 Claims, 8 Drawing Sheets

U.S. PATENT DOCUMENTS

| | | | |
|---|---|---|---|
| 2004/0179493 A1* | 9/2004 | Khan | 370/332 |
| 2005/0143084 A1* | 6/2005 | Cheng et al. | 455/452.2 |
| 2005/0181811 A1* | 8/2005 | Magnusson et al. | 455/458 |
| 2005/0260998 A1* | 11/2005 | Casaccia et al. | 455/452.2 |
| 2005/0289256 A1* | 12/2005 | Cudak et al. | 710/62 |
| 2008/0287138 A1* | 11/2008 | Yoon et al. | 455/452.2 |

OTHER PUBLICATIONS

Chulsik Yoon, et al.; Channel Quality Information (CQI) Report for Mobility Support; IEEE 802.16 Broadband Wireless Access Working Group, Jan. 2, 2004, pp. 1-6.

\* cited by examiner

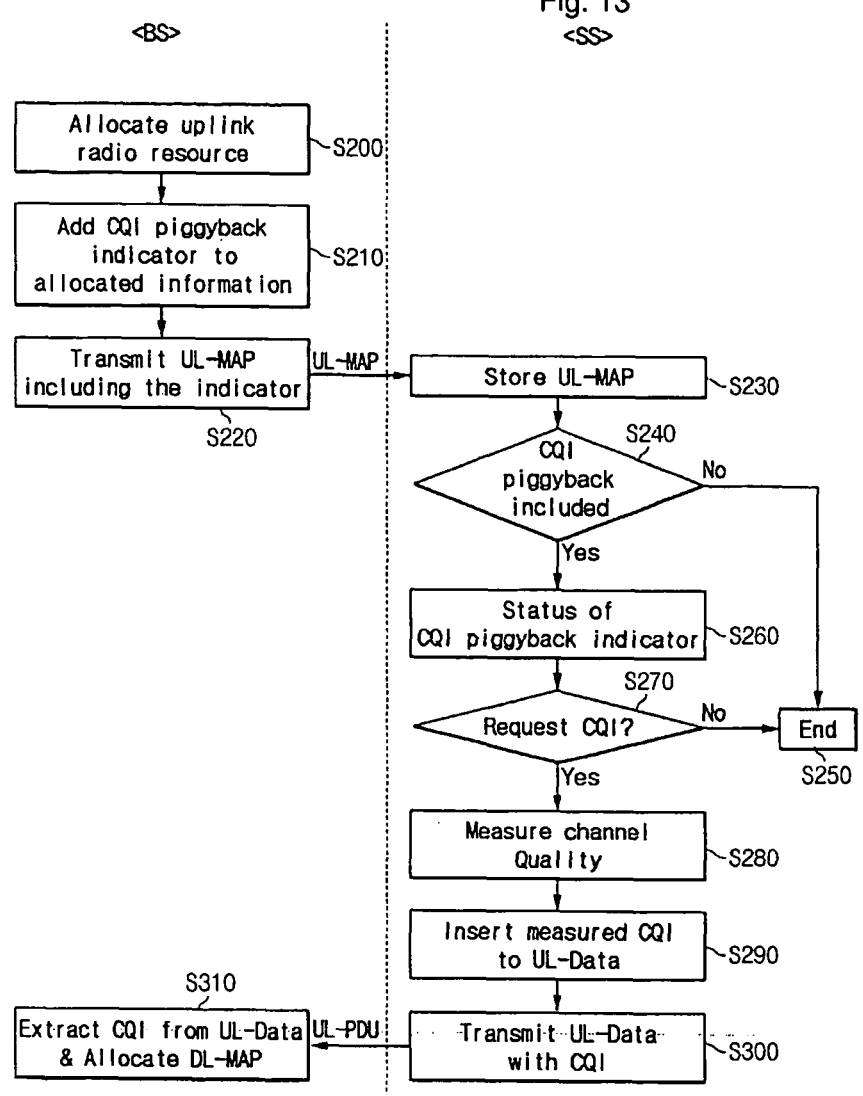

METHOD FOR REQUESTING AND REPORTING CHANNEL QUALITY INFORMATION IN WIRELESS SYSTEM AND APPARATUS THEREOF

TECHNICAL FIELD

The present invention relates to a mobile communication system. More specifically, the present invention relates to a method for requesting and reporting channel quality information in a mobile communication system such as a wireless portable Internet system and apparatus thereof.

Background Art

The wireless portable Internet is a next generation communication system for further supporting mobility, in addition to a short range data communication system which uses fixed access points (APs) such as the conventional wireless local area network (LAN).

Various standards have been proposed for the wireless portable Internet, and the international standardization on the portable Internet is in progress by the IEEE 802.16.

The wireless LAN method such as the conventional IEEE 802.11 provides a data communication method which allows short-range radio communication with reference to stationary access points, which provides no mobility of the subscriber station (SS) but which supports wireless short-range data communication other than wired short-range data communication.

Meanwhile, a new wireless portable Internet system currently progressed by the IEEE 802.16 working group is designed to support the mobility to the subscriber station and thus provide a seamless data communication service thereto when the subscriber station moves from one cell covered by a first base station to a second cell covered by a second base station.

The mobile communication systems including the above-described wireless portable Internet system have been developed for communication systems which can support voice services as well as high-speed packet data services simultaneously.

Information on the radio channel quality of a mobile subscriber station is very important since the information is used to determine an appropriate adaptive modulation and channel coding (AMC) level for the corresponding subscriber station in the system for supporting high-speed mobility. Also, when the information on the radio channel quality is found to be erroneous, a resource allocated to the subscriber station may be wasted, and it is accordingly very important to provide reliable channel quality information (CQI).

In order to collect information on the channel quality, the base station selects a predetermined subscriber station for each slot from among a plurality of subscriber stations, transmits packet data thereto, and receives channel quality information on a forward channel from the selected subscriber station to determine transmission parameters such as data rates, code rates, and modulation orders.

When the base station transmits a CQI request message to a plurality of subscriber stations, each subscriber station reports a channel quality measurement result to the base station in an additional message format.

DISCLOSURE OF INVENTION

Technical Problem

However, in case that the base station requests the channel quality information from a plurality of subscriber stations at one frame, the method may exhaust downlink resources since the base station transmits similar messages to the subscriber stations individually. Further, when the base station transmits the message to the subscriber station by using an inadequate AMC level, in detail, when the base station transmits the CQI request message thereto by using the AMC level determined based on the existing channel quality even though the channel has already been degraded, some subscriber stations may fail to receive the CQI request message itself.

Also, overheads of messages are increased when the respective subscriber stations individually transmit a response message for the channel quality measurement result to the base station.

In addition, the mobile system does not guarantee allocation of uplink resources for transmitting the response message of the channel quality measurement result, and hence, heavy delay may be generated when the subscriber station transmits the response message to the base station. As a result, the subscriber stations may fail to transmit the on-time response message thereto, and the base station may not adaptively process the message following the mobile environment.

Technical Solution

In one aspect of the present invention, a method for reporting channel quality information for representing the channel quality by subscriber station in the mobile communication system is provided. In this method, uplink radio resource allocation information for transmitting uplink data from base station is received, whether the channel quality information indicator is included in the allocation information or not, the channel quality information indicator represents channel quality information report is determined, the channel quality information is generated by measuring the radio channel quality for communicating with the base station, when the channel quality information indicator is not included in the allocation information; and, the channel quality information are added to the uplink data and the uplink data are transmitted to the base station through the radio resource corresponding to the allocation information, the channel quality information indicator is the piggyback indicator, the uplink data includes the header having data to be transmitted and information for the data or subscriber station, the uplink data is transmitted by adding subheader including the channel quality information to the header of the uplink data.

In another aspect of the present invention, a method for reporting channel quality information for representing channel quality by subscriber station in mobile communication system allocates uplink radio resource to the subscriber station having data to be transmitted to the uplink, add channel quality information indicator for requesting the channel quality information to the uplink radio resource allocation information and request channel quality information on transmitting the uplink radio resource allocation information including the channel quality information indicator to the subscriber station.

Further, the method receives the uplink data provided by the subscriber station through the radio resource set according to the uplink radio resource allocation information, extracts the channel quality information from the uplink data and allocate the downlink radio resource to the subscriber station based on the channel quality information.

In another aspect of the present invention, a method for requesting and reporting channel quality information in mobile communication system wherein base station and subscriber station are coupled by the mobile network add channel quality information indicator to request channel quality information report to uplink radio resource for the subscriber station having the data to be transmitted to the uplink by the base station and transmitting the uplink radio resource allocation information to the subscriber station, generate the channel quality information by measuring the channel quality such that the subscriber station received the uplink radio resource allocation information communicates with the base station according to the channel quality information indicator, and includes the channel quality information to the uplink data by the subscriber station and the transmitting the uplink data to the base station through the radio resource according the allocation information.

This method may be adapted to the wireless portable internet system.

In another aspect of the present invention, a base station for requesting channel information in a mobile communication system comprises a base station resource controller for including channel quality information indicator for requesting channel quality information report in uplink radio resource allocation information, a digital signal transmitter for performing adaptive modulation and coding on the uplink radio resource allocation information to generate digital signals and an analog signal transmitter for converting the digital signals into analog signals and transmitting the analog signals to the subscriber stations. The base station resource controller includes a uplink resource allocator for allocating the uplink radio resource to the subscriber station to generate the uplink radio resource allocation information, and a channel quality requester for generating channel quality information indicator to the request the channel information to the subscriber station, wherein the uplink resource allocator transmits the uplink radio resource allocation information provided with the channel quality information indicator to the digital signal transceiver.

In another aspect of the present invention, a subscriber station for reporting channel quality information in a mobile communication system, comprises an allocated resource checker for receiving uplink radio resource allocation information transmitted from a base station and the checking radio resource set for the subscriber station by analyzing the allocation information a channel quality reporter for generating the channel quality information by measuring the channel quality so as to communicate the base station when the uplink radio resource allocation information includes channel quality information indicator for requesting channel quality information indicator, an uplink data generator for generating uplink data to be transmitted to the base station and adding the channel quality information to the uplink data, and a transmitter for transmitting the uplink data to the base station through the radio resource conformed by the allocated resource checker.

Therefore, the reliable CQI for determining the modulation and channel coding level used to the data transmission can be provided rapidly and efficiently in the wireless mobile communication system (or wireless internet).

BRIEF DESCRIPTION OF THE DRAWINGS

The accompanying drawings, which are incorporated in and constitute a part of the specification, illustrate an embodiment of the invention, and, together with the description, serve to explain the principles of the invention, wherein:

FIG. 13 shows a flowchart for requesting and reporting channel quality information according to an exemplary embodiment of the present invention;

FIG. 14 shows a format of the channel quality information request message according to an exemplary embodiment of the present invention.

BEST MODE FOR CARRYING OUT THE INVENTION

Figure 1:
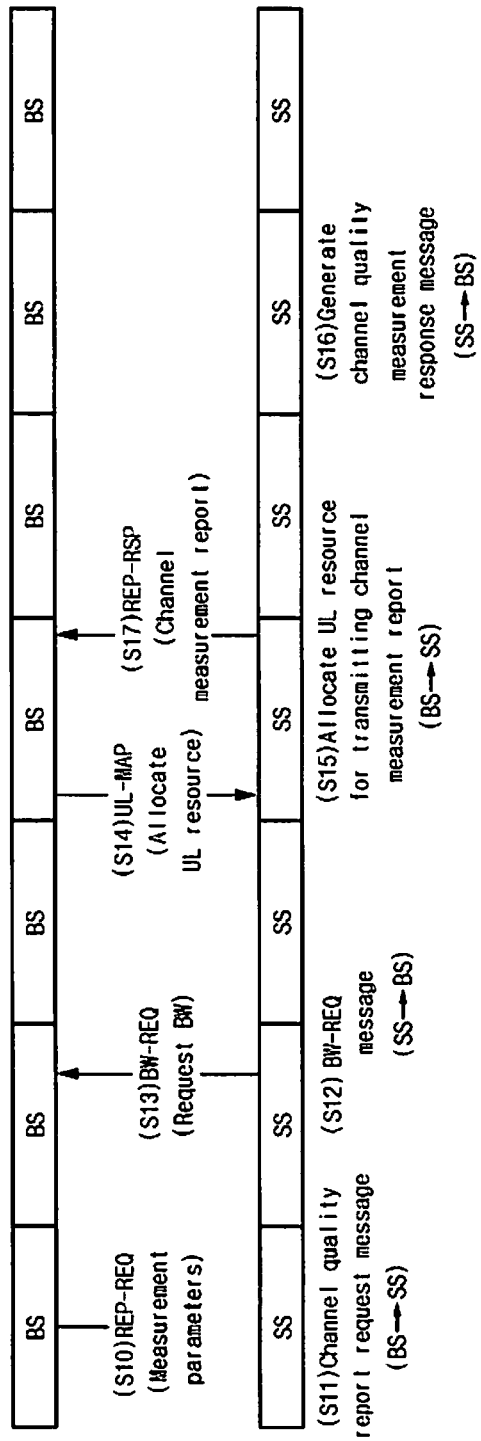
FIGS. 1 to 3 show general flowcharts for requesting and reporting channel quality information.

In the following detailed description, only the preferred embodiment of the invention has been shown and described, simply by way of illustration of the best mode contemplated by the inventor(s) of carrying out the invention. As will be known, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

Figure 2:
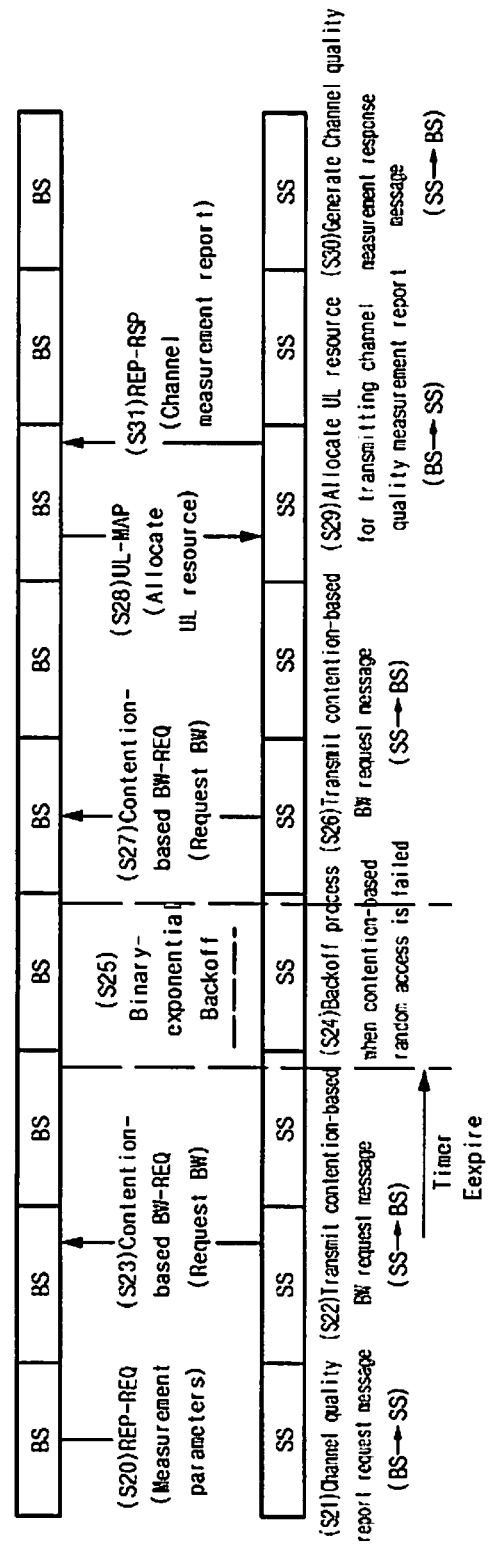
Figure 3:
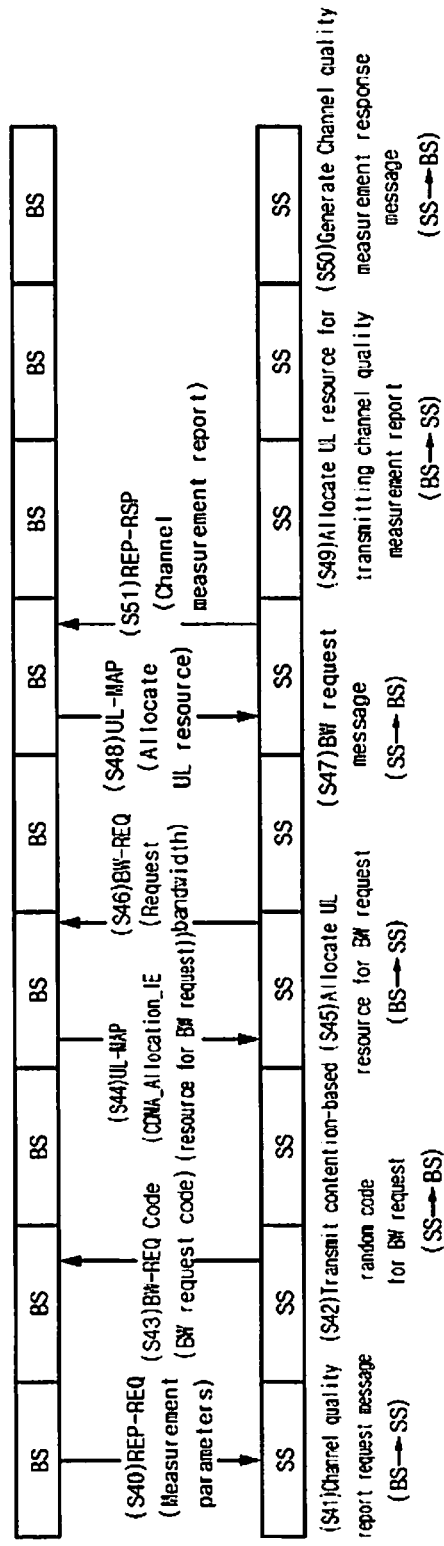

FIGS. 1 to 3 show general flowcharts for measuring and reporting channel quality information in a mobile communication system. In FIGS. 1 to 3, the transverse axis stands for the time passage, BS symbolizes the base station and SS symbolizes the subscriber station.

Referring to FIG. 1, in order to measure the radio channel quality between a base station and a subscriber station, the subscriber station receives a CQI request from the base station and requests a bandwidth for a channel measurement report therefrom (S10 to S13), the base station allocates an uplink resource to the subscriber station (S14 and S15), and the subscriber station uses the uplink resource and transmits the channel measurement report to the base station (S16 and S17).

However, a delay of a predetermined time occurs because of the request and allocation of the uplink bandwidth until the subscriber station reports the channel measurement information to the base station, since the base station allocates no uplink resource to be used for the channel measurement report in advance when requesting channel quality information from the subscriber station, thereby very probably failing to quickly process the varied channel condition and satisfy the quality of service (QoS).

FIG. 2 shows a process for the subscriber stations to request a bandwidth from the base station in a contention-based manner. The respective subscriber stations request a bandwidth for a channel measurement report from the base stations (S20 to S23) in a contention-based manner, and when the request is failed, the subscriber stations attempt a contention-based bandwidth request again through a back-off process (S24 to S27). When the attempt is found to be successful, the base station allocates an uplink resource to the corresponding subscriber station, and the subscriber station transmits a channel measurement report to the base station through the allocated uplink resource (S28 to S30). In this case, a delay is generated by the back-off, and the request and allocation of the uplink bandwidth.

FIG. 3 shows a process for a subscriber station to transmit a random code for a bandwidth request to the base station in the general case of requesting and reporting the channel quality information.

When the subscriber station transmits a contention-based random code for a bandwidth request to the base station according to the channel quality information provided by the base station (S40 to S43), the base station cannot determine from the bandwidth request code whether the subscriber station will transmit bandwidth request information (i.e., an amount of data stored in a transmission buffer of uplink data) or transmit the message for the channel measurement report. Accordingly, the subscriber station may be delayed in transmitting the message for the channel measurement report to the base station even though the subscriber station has successfully transmitted the random code to the base station, and hence, the time delay is inevitable.

As shown in FIG. 3, when the base station allocates a resource for a bandwidth request and the subscriber station transmits a bandwidth request message before the subscriber station transmits the channel measurement report to the base station, the base station must allocate the uplink resource (S44 to S49), and hence, a time delay is generated and it is difficult to guarantee the QoS because of the undesired delay.

Also, the base station must transmit a CQI request message to each subscriber station that will generate a channel measurement report. Hence, when transmitting the CQI request message to a plurality of subscriber stations in a frame, the base station respectively transmits the same unicast message (e.g., a basic connection identifier (CID) according to the EEE 802.16 standard) to the subscriber stations, thereby increasing overheads.

To resolve the above-described problems generated while requesting and reporting the channel quality information in the mobile communication system, a subsequent method will now be described.

Figure 4:
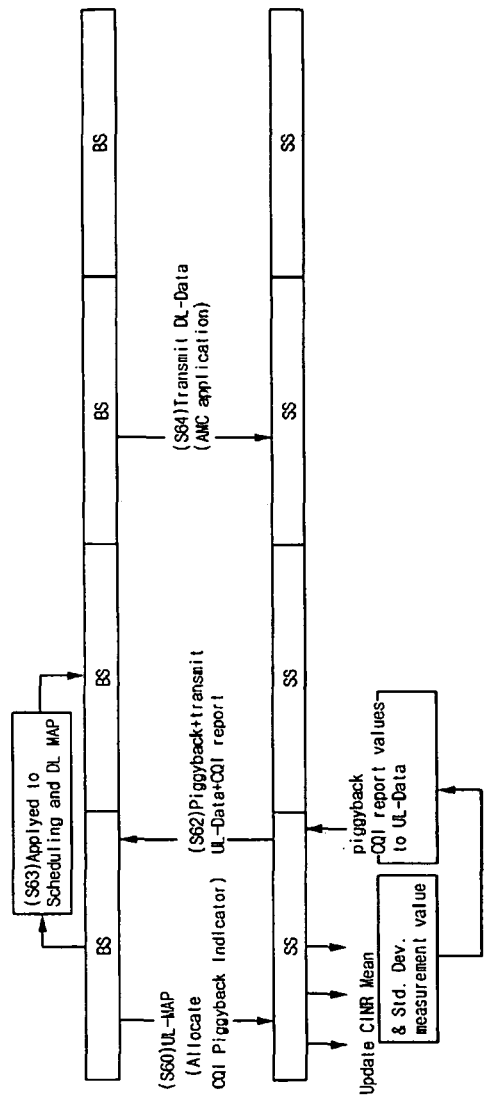
FIG. 4 shows a flowchart for requesting and reporting channel quality information according to an exemplary embodiment of the present invention.

FIG. 4 shows a flowchart for requesting and reporting channel quality information according to an exemplary embodiment of the present invention.

In this embodiment, in order for the subscriber station to report the downlink CQI using the allocated uplink radio resource, CQI piggyback indicator is set to an uplink radio resource allocation information (hereinafter, referred to as "UL-MAP") so that the base station may request the CQI report for the downlink to the subscriber station. Accordingly, the subscriber station transmits the piggyback message incorporated in the uplink data together to report the CQI for the downlink, thereby increasing the efficiency of CQI report.

In more detail, as shown in FIG. 4, the connection should be provided between the base station and the subscriber station and the uplink radio resource should be allocated to the corresponding subscriber station for dada to be transmitted to the uplink.

In this case, on transmitting the UL-MAP to the subscriber station, the piggyback indicator is inserted in the UL-MAP and is transmitted along with the UL-MAP (S60). The term "piggyback" used herein is referred to as the predetermined data is added to the uplink data on transmitting the uplink data, for example, the additive subheader is added to the header of the uplink data so that the predetermined information is transmitted by including the same in the subheader. As a result, the base station can transmit the piggyback indicator marking which information is piggybacked and transmitted in such a manner that the piggyback indicator is included in the downlink data. In this embodiment, the indicator to piggyback CQI of the downlink is included in the UL-MAP) and transmitted.

The subscriber station measures the downlink channel quality in response to the piggyback indicator included in the UL-MAP and transmits the CQI according to the measured downlink channel quality in such a manner that it is included in the uplink data to be transmitted to the base station (S61 and S62).

Consequently, the base station uses the UL-MAP to request the CQI report and the subscriber station uses the piggyback information in the uplink data to transmit the CQI thereby providing the efficient and seamless channel quality report for the mobile environment.

A structure and operations of a device for requesting and reporting the channel quality information will now be described in detail, on the basis of the wireless portable Internet system, and without being restricted to this, will also be applicable to various other mobile communication systems.

Figure 5:
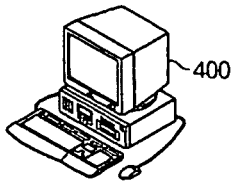
FIG. 5 shows a schematic diagram for a wireless portable Internet system according to an exemplary embodiment of the present invention.
Figure 5:
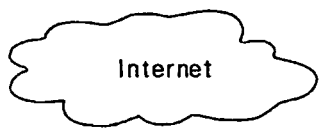
Figure 5:
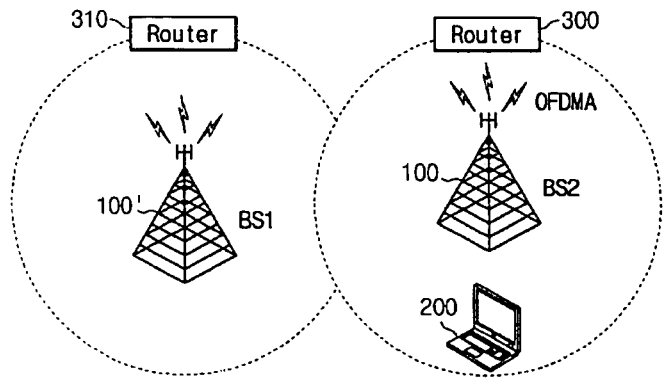

FIG. 5 shows a schematic diagram for a wireless portable Internet system according to an exemplary embodiment of the present invention.

The wireless portable Internet system includes base stations 100 and 100', a subscriber station 200 for performing radio communication with the base stations, routers 300 and 310 connected to the base stations through a gateway, and the Internet.

The wireless portable Internet system guarantees mobility and provides seamless data communication-services when the subscriber station 200 shown in FIG. 5 moves from a cell covered by a first base station 100 to another cell covered by a second base station 100', supports a handover function, and allocates dynamic IP addresses as the subscriber station moves.

The wireless portable Internet subscriber station 200 and each of the base stations 100 and 100' communicate with each other through the orthogonal frequency division multiple access (OFDMA) method which is a multiplexing method having the frequency division method for using a plurality of orthogonal frequency subcarriers as a plurality of subchannels combined with the time-division multiplexing (TDM) method. The OFDMA method is resistant against fading generated by multipaths and has high data rates, and the exemplary embodiment is not restricted to the OFDMA method.

The IEEE 802.16e standard applies the AMC scheme to select adaptive modulaton and coding scheme by means of request/acceptance between the subscriber station 200 and the base stations 100 and 100'.

Figure 6:
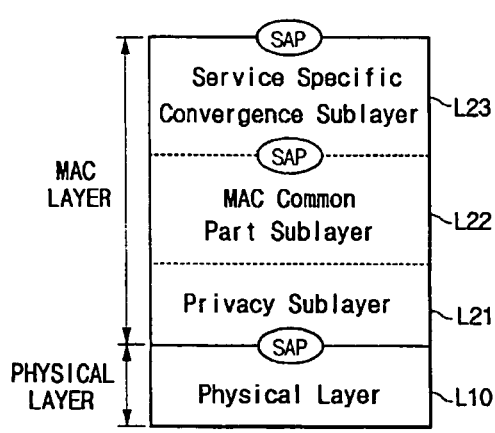
FIG. 6 shows a hierarchical diagram of a wireless portable Internet system.

FIG. 6 shows a hierarchical diagram of a wireless portable Internet system.

The IEEE 820.16e wireless portable Internet system is classified into a physical layer L10 and media access control (MAC) layers L21, L22 and L23.

The physical layer L10 performs wireless communication functions such as modulation/demodulation, coding/decoding, etc. as performed by a normal physical layer.

Meanwhile, the wireless portable Internet system does not have function-specific MAC layers as a wired Internet system, but a single MAC layer in charge of different functions. The MAC layer includes a privacy sublayer L21, a MAC common part sublayer L22, and a service specific convergence sublayer L23.

The service specific convergence sublayer L23 performs payload header suppression and QoS mapping functions in consecutive data communication.

The MAC common part sublayer L22 is the core of the MAC layer which is in charge of system access, bandwidth allocation, connection establishment and maintenance, and QoS control.

The privacy sublayer L21 performs functions of equipment authentication and security key exchange, and encryption. The device authentication is carried on by the privacy sublayer L21, and the user authentication by an upper layer of the MAC (not illustrated).

Figure 7:
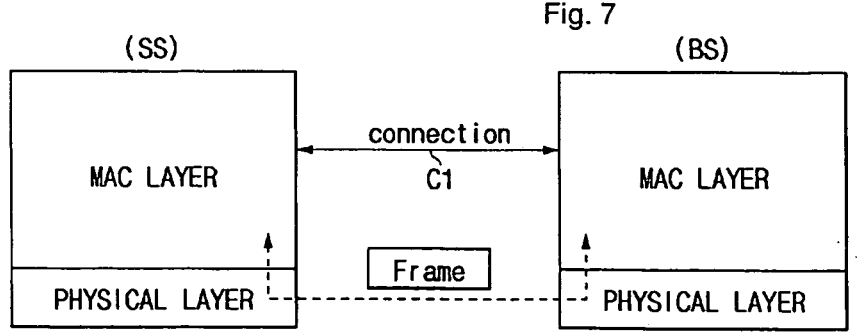
FIG. 7 shows a schematic diagram of a connection structure between a base station and a subscriber station in a wireless portable Internet system.

FIG. 7 shows a schematic diagram of a connection structure between a base station and a subscriber station in the wireless portable Internet system.

A connection is provided between the MAC layers of the subscriber station and the base station. The term "connection C1" as used herein does not refer to a physical connection, but to a logical connection that is defined as a mapping relationship between the MAC peers of the subscriber station and the base station for traffic transmission of one service flow.

Hence, the parameter/message defined on the connection C1 refers to a function executed between the MAC peers. Actually, the parameter/message is processed into a frame, which is transferred through the physical layer and analyzed so as to control the MAC layer to execute the function corresponding to the parameter/message. A MAC message transferred through the connection C1 includes a connection identifier (CID) which is an MAC layer address for identifying the connection; radio resource allocation information (MAP) for defining a symbol offset and a subchannel offset of a burst time-divided by a subscriber station in a downlink/uplink, and defining a number of symbols of the allocated resource and a number of subchannels; and channel descriptors (including a downlink channel descriptor (DCD) and an uplink channel descriptor (UCD)) for describing a characteristic of a physical layer according to characteristics of the downlink/uplink. In addition, the MAC message includes various messages for performing request (REQ), response (RSP), and acknowledgment (ACK) for various operations.

Figure 8:
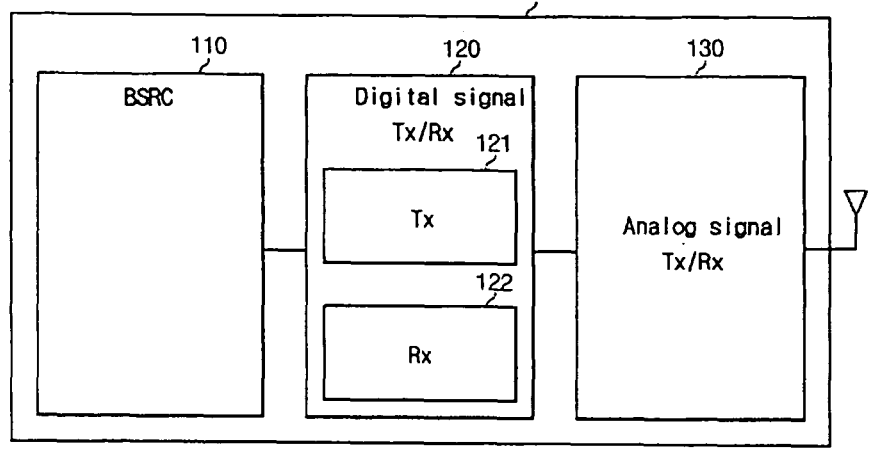
FIG. 8 shows a block diagram of a base station according to an exemplary embodiment of the present invention.

FIG. 8 shows a block diagram of a base station in the above-structured wireless portable Internet system according to an exemplary embodiment of the present invention.

The base station 100 includes a base station resource controller (BSRC) 110, a digital signal transceiver 120, and an analog signal transceiver 130.

The base station resource controller 110 allocates downlink radio resources to the subscriber station and requests channel quality information report as to confirm the channel quality.

Figure 9:
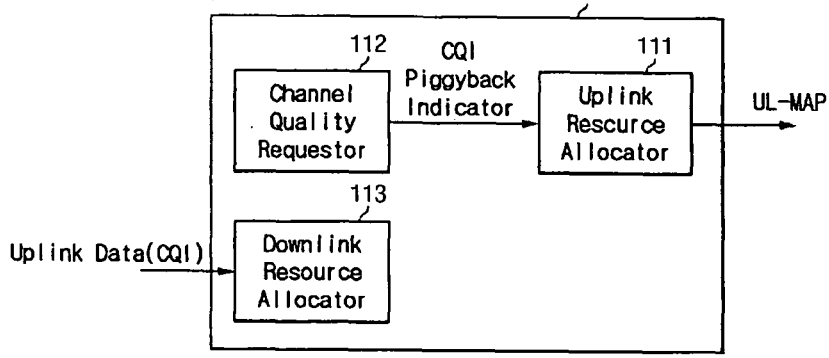
FIG. 9 shows a block diagram of the base station resource controller shown in FIG. 8.

FIG. 9 shows a block diagram of the base station resource controller 110 according to the exemplary embodiment of the invention.

As shown in FIG. 9, the base station resource controller 110 includes an uplink resource allocator 111 for allocating uplink radio resources to the subscriber station, a channel quality requester 112 for requesting channel quality measurement, and an uplink resource allocator 113 for allocating downlink radio resources according to channel quality information provided by the subscriber station.

The uplink resource allocator 111 allocates the uplink radio resource and generates the allocation information UL-MAP in order that the subscriber station may transmit the various signals including the predetermined data. Further, the uplink resource allocator 111 adds the piggyback indicator provided by the channel quality requester 112 to the UL-MAP so that it may be transmitted to the subscriber stations.

The channel quality requester 112 requests the CQI from the predetermined subscriber station, particularly, generates the piggyback indicator to request for transmitting the CQI piggybacked to the uplink data. The term "piggyback indicator" used herein is called conveniently, as requesting for piggyback of CQI. Particularly, the channel quality request 112 allows the status of the CQI piggyback indicator to be set as the predetermined values according to the necessity of the CQI so that the subscriber station can know the transmission of CQI through the indicator after.

The downlink resource allocator 113 extracts the channel quality information from the uplink data provided by the subscriber stations and determines scheduling and an AMC level for the respective subscriber stations to be transmitted to the downlink according to the extracted channel quality information.

The digital signal transceiver 120 includes a transmitter 121 and a receiver 122 for performing selectively the transmitting/receiving function. The transmitter 121 modulates and encodes a plurality of message such a UL-MAP provided by the base station resource controller 110 with above structure, and the analog signal transceiver 130 broadcasts the modulated and encoded message to the subscriber stations over the air.

The analog signal transceiver 130 and the receiver 122 of the digital signal transceiver 120 receive the message including the information according to the CQI piggyback indicator and transmit the message to the base station resource controller 110.

A structure of the subscriber station for measuring and reporting the quality of the channel according to a corresponding channel quality request provided by the base station 100 will now be described.

Figure 10:
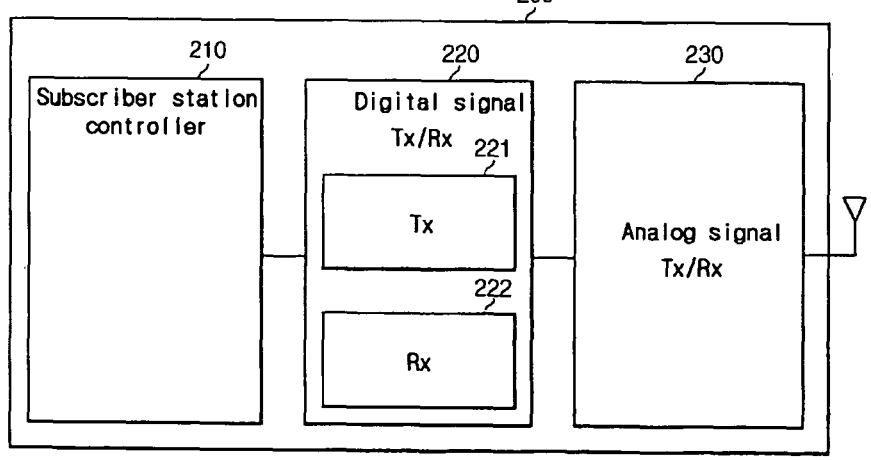
FIG. 10 shows a block diagram of a subscriber station according to an exemplary embodiment of the present invention.

FIG. 10 shows the structure of the subscriber station according to an exemplary embodiment of the present invention.

The subscriber station 200 includes a subscriber station controller 210, a digital signal transceiver 220, and an analog signal transceiver 230 as shown in FIG. 10.

The subscriber station controller 210 controls transmitting/receiving between the base station and the subscriber station, in this embodiment, generates the channel quality information according to UL-MAP, and piggyback the generated CQI over the data to be provided to uplink to transmit the same.

Figure 11:
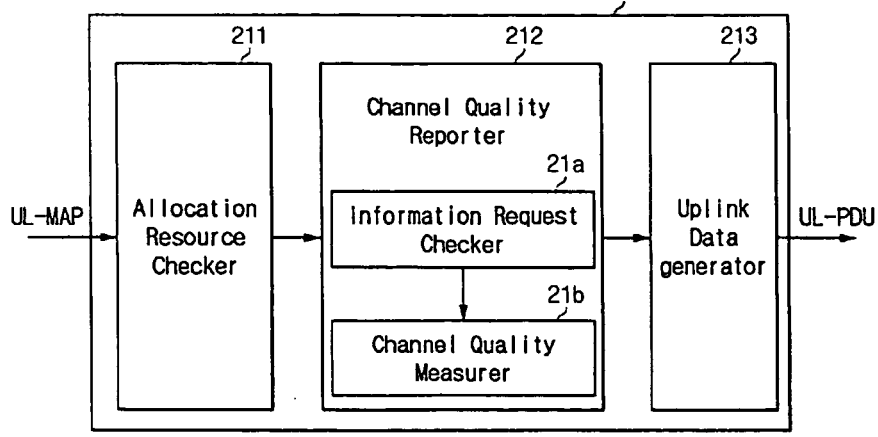
FIG. 11 shows a block diagram of the base station resource controller shown in FIG. 10.

FIG. 11 shows a block diagram of a subscriber station controller according to the exemplary embodiment of the invention.

A subscriber station controller 210 includes an allocated resource checker 211, a channel quality reporter 212, an uplink data generator 213.

The allocated resource checker 211 analyzes UL-MAP to check the radio resource allocated to the corresponding subscriber station and transmits the uplink data through the checked radio resource to the base station.

As shown in FIG. 10, the channel quality reporter 212 includes an information request checker 21$a$ for checking whether the CQI piggyback indicator is included in the UL-MAP and/or whether the CQI is requested according to the status of CQI piggyback indicator, a channel quality measurer 21$b$ for measuring the downlink channel quality and for generating a CQI according to the measured downlink channel quality. For example, the channel quality measurer 21*b* measures the carrier to interference noise ratio (CINR) many times based on the signals transmitted through the downlink channel and generate the CQI including the CINR mean values and the standard deviation. Methods and devices for measuring the CINR are realized by using well-known means, and hence, no corresponding description will be provided.

The uplink data generator 213 generates the UL-PDU to be transmitted to the base station, particularly, allows the CQI transmitted from the channel quality reporter 212 to be piggybacked on the uplink data and transmits the piggybacked uplink data to the base station.

The subscriber station controller 210 may further include many means for transmitting, receiving and managing data between the base station 100 and the subscriber station as well as the channel quality reporter, such means have been well-known, and hence, no corresponding description will be provided.

The digital signal transceiver 220 includes a transmitter 221 and a receiver 222 for performing the transmitting/receiving functions including modulation and encoding. The analog signal transceiver 230 broadcasts the modulated and encoded message to the subscriber stations over the air.

The digital transceivers 120 and 220 and the analog signal transceivers 130 and 230 of the base station and the subscriber station will not be described since they are well known to a person skilled in the art.

A detailed method for requesting and reporting the channel quality information will now be described based on above structure.

Figure 12:
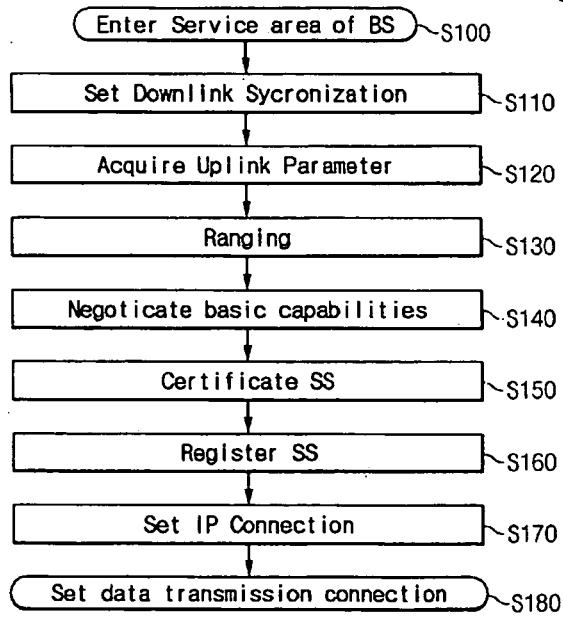
FIG. 12 shows a flowchart of a connection process between a base station and a subscriber station according to an exemplary embodiment of the present invention.

FIG. 12 shows a flowchart of a connection process between a base station and a subscriber station according to an exemplary embodiment of the present invention;

The subscriber station 200 enters the service area of the base station 100 (S100), and the base station 100 is set by the downlink synchronization with the subscriber station 200 (S110). When the base station 100 is set by the downlink synchronization, the subscriber station 200 acquires the uplink parameters (S120). For example, the parameter may include channel descriptor message according to the characteristics of the physical layer (i.e. ICNR).

Next, the ranging process is performed between the subscriber station 200 and the base station 100 (S130). The ranging process is to correct information on timing, power, and frequency to coincide between the subscriber station 200 and the base station 100, and the initial ranging process is performed, and the periodic ranging is then performed periodically.

When the ranging process ends, the negotiation of basic capabilities is performed to set the connection between the subscriber station 200 and the base station 100 (S140). If the negotiation of basic capabilities ends, the base station 100 performs the certificate of the subscriber station 200 by using such a system identifier as the MAC address and a certificate (S150).

When the permission of the wireless portable internet system is obtained by the certificate of the subscriber station 200, the base station 100 registers the system address of the subscriber station 200 (S160) sets IP connection to provide the IP address for the subscriber station 200 (S170). The address set subscriber station IP sets the connection for the data transmission (S180).

As a result, when the connection is set between the base station and the subscriber station and the uplink resource allocator 111 allocates the uplink radio resource to the subscriber station 200, the subscriber station 200 can transmit the predetermined data to the uplink, i.e. the base station through the allocated radio resource.

As above-noted, when the uplink radio resource for the data to be transmitted is a located to the corresponding subscriber station, the subscriber station provides the downlink channel quality for the base station.

FIG. 13 shows a flowchart for requesting and reporting channel quality information according to an exemplary embodiment of the present invention.

In order to request CQI from the subscriber having the allocated uplink radio resource and the data to be transmitted to the uplink, the channel quality requester 112 generates CQI piggyback indicator and set the CQI piggyback indicator to request CQI (S200-S210). When the channel quality requester 112 requests the CQI, the CQI piggyback indicator may be set by for example, "1."

After the CQI piggyback indicator is included in the UL-MAP generated by the uplink resource allocator 111, the CQI piggyback indicator can be transmitted to the subscriber station through the transceiver 121, 130 (S220). For example, the UL-MAP can be transmitted through the broadcast channel.

FIG. 14 shows a format of the channel quality information request message according to an exemplary embodiment of the present invention, wherein the UL-MAP includes the CQI piggyback indicator for requesting CQI, the CQI piggyback indicator is set by "1."

The subscriber station controller 210 of the subscriber station 200 receives and stores the UL-MAP transmitted form the base station 100, report the CQI using the UL-MAP.

The information request checker 21a of the channel quality reporter 212 checks whether the CQI piggyback indicator is included in the UL-MAP (S240). When the CQI piggyback indicator is not included in the UL-MAP, the CQI report process according to the present invention is not performed (S250), which is noted as "end" in FIG. 12.

When the CQI piggyback indicator is included in the UL-MAP, the CQI request is determined according to the set a CQI piggyback indicator. In more detail, when the CQI piggyback indicator is set by "1," it is determined that the base station requests the CQI.

The CQI request is determined according to the indicator (S260 and S270). For example, when the CQI piggyback indicator is set by "1," it is determined that the base station requests the CQI.

When the CQI piggyback indicator is set to request the CQI, the channel quality measurer 21*b* measures the carrier to interference noise ratio (CINR) for the downlink channel many times and generates the CQI including the CINR mean values, the CINR standard deviation based on the measured values (S280).

The uplink data generator 213 piggybacks the CQI over the data to be transmitted to the base station and transmits the piggybacked uplink data to the base station (S290).

In more detail, the uplink data includes the header portion having the information of the subscriber station and the data to be transmitted, and the data portion having the desired data to transmit.

In this embodiment, the header portion has a plurality of predetermined subheaders inserted therein and is transmitted along with the subheaders, the subheader includes such information elements as the measured CQI mean values and CQI standard deviation. The header of uplink data is provided with identifiers for marking the subheader of CQI report, (Type field) and first of all, transmits the subheader of CQI report. For example, according to the IEEE 802.16, the subheader of CQI report is illustrated by the generic MAC header Type bit #5 for the uplink data, the subheader of CQI report is defined as followed:

CINR Mean Value (5 bits): (display as 32-level)
Standard Deviation (3 bits): (display as 8-level)

The digital signal transceiver 220 and the analog signal transceiver 230 transmit the uplink data to the base station 100 through the radio resource designated by the UL-MAP (S300).

The downlink resource allocator 113 determines scheduling and an AMC level of the respective subscriber stations to be transmitted in the downlink, using the downlink CINR mean values and standard deviation included in the CQI response message (referred to as a report response (REP_RSP) message hereinafter) which are provided by the quality report channel of the respective subscriber stations (S310).

As above-noted, the CQI is piggybacked on the data to be transmitted to the uplink without additive channels so that the optical modulation and the channel coding level may be adapted for the subscriber to transmit or receive the data corresponding to the variance of mobile wireless channel environment, thereby increasing the transmission amount of the downlink and enhancing the performance.

With the above-noted embodiment of the present invention, the wireless mobile communication system corresponds to the rapid variance of the channel environment by piggybacking the CQI over the uplink data of the subscriber station. As a result, in the wireless mobile communication system (or wireless internet), the reliable CQI for determining the modulation and channel coding level used to the data transmission can be provided rapidly and efficiently.

Also, since the base station uses the UL-MAP to request the CQI, no additive message transmitting process needs to request the CQI.

In more detail, since the subscriber station requests the CQI through the UL-MAP and piggybacks the CQI over the uplink data, the additive bandwith allocation process is not required to report the CQI. T and the CQI corresponding to the most resent channel quality may be rapidly and accurately transmitted to the base station. As a result, the seamless and efficient channel quality report can be performed in the wireless communication system, also the optical modulation and the channel coding level can be adapted for the subscriber to transmit or receive the data corresponding to the channel quality.

Industrial Applicability

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The invention claimed is:

1. A method for reporting channel quality information (CQI) for representing channel quality by a subscriber station in a mobile communication system, comprising:
   a) receiving uplink radio resource allocation information for transmitting uplink data from a base station;
   b) determining whether a channel quality information indicator is included in the allocation information, the channel quality information indicator representing a channel quality information report;
   c) generating the CQI by measuring a radio channel for communicating with the base station, when the channel quality information indicator is included in the allocation information; and
   d) including the CQI to the uplink data and transmitting the uplink data to the base station through a radio resource corresponding to the allocation information for the uplink data, without requesting resource allocation to transmit the CQI,
   wherein the uplink data includes data to be transmitted, and a header having information for the data and the subscriber station, and wherein the uplink data is transmitted by adding a subheader including the CQI to the header of the uplink data.

2. The method for reporting the channel quality information by the subscriber station of claim 1, wherein the channel quality information indicator is a piggyback indicator.

3. The method for reporting the channel quality information by the subscriber station of claim 1, wherein the subheader including the channel quality information is added in advance to residual subheaders when a plurality of subheaders is added to the header of the uplink data.

4. The method for reporting the channel quality information by the subscriber station of claim 1, wherein the allocation information includes the channel quality information indicator, and radio channel quality is measured to generate the channel quality information when the CQI indicator is set to a predetermined value for a request of the CQI, in step (c).

5. A method for reporting channel quality information for representing channel quality by a subscriber station in a mobile communication system, comprising:
   a) allocating an uplink radio resource to the subscriber station having data to be transmitted to an uplink;
   b) adding a channel quality information indicator for requesting the channel quality information to uplink radio resource allocation information;
   c) transmitting the uplink radio resource allocation information including the channel quality information indicator to the subscriber station to request channel quality information (CQI);
   d) receiving uplink data from the subscriber station through the uplink radio resource set according to the uplink radio resource allocation information, wherein the uplink data includes data to be transmitted, a header having information for the data and the subscriber station, and a subheader including CQI;
   e) extracting the channel quality information from the uplink data; and
   f) allocating downlink radio resource to the subscriber station based on the CQI.

6. The method for the reporting channel quality information by the subscriber station of claim 5, wherein the channel quality information indicator is a piggyback indicator, and the channel quality information indicator is set to a predetermined value for a request of the channel quality information indicator in step (b).

7. A method for requesting and reporting channel quality information (CQI) in a mobile communication system wherein a base station and a subscriber station are coupled by a mobile network, comprising:
   a) controlling the base station to add a channel quality information indicator for requesting a CQI report to an uplink radio resource for the subscriber station having data to be transmitted to the uplink, and transmitting uplink radio resource allocation information to the subscriber station;

b) controlling the subscriber station to measure radio channel quality according to the channel quality information indicator, and to generate the CQI; and c) controlling the subscriber station to include the CQI to the uplink data and to transmit the uplink data to the base station through the radio resource according to the allocation information for the uplink data, without requesting resource allocation to transmit the channel quality information, wherein the uplink data includes data to be transmitted, and a header having information for the data and the subscriber station, and wherein the uplink data is transmitted by adding a subheader including the CQI to the header of the uplink data.

8. The method of claim 7, further comprising:

controlling the base station to allocate a downlink radio resource to the subscriber station based on the channel quality information included in the uplink data provided by the subscriber station.

9. The method of claim 7, wherein the mobile communication system is a wireless portable internet system.

10. A base station apparatus for requesting channel information in a mobile communication system, comprising:

a base station resource controller for including a channel quality information indicator for requesting a channel quality information (CQI) report from uplink radio resource allocation information;

a digital signal transmitter for performing adaptive modulation and coding on the uplink radio resource allocation information to generate digital signals;

an analog signal transmitter for converting the digital signals into analog signals and transmitting the analog signals to subscriber stations; and allocator for receiving uplink data from the subscriber station through uplink radio resource set according to the uplink radio resource allocation information, wherein the uplink data includes data to be transmitted, a header having information for the data and the subscriber station, and a subheader including CQI and for allocating a downlink radio resource to the subscriber station based on the CQI included in uplink data transmitted from the subscriber station according to the channel quality information indicator.

11. The base station of claim 10, wherein the base station resource controller includes:

an uplink resource allocator for allocating an uplink radio resource to a subscriber station to generate the uplink radio resource allocation information; and a channel quality requestor for generating the channel quality information indicator to request channel information from the subscriber station, wherein the uplink resource allocator transmits the uplink radio resource allocation information provided with the channel quality information indicator to the digital signal transmitter.

12. The base station of claim 11, further comprising a downlink resource allocator for allocating a downlink radio resource to the subscriber station based on the channel quality information included in uplink data transmitted from the subscriber station according to the channel quality information indicator.

13. A subscriber station for reporting channel quality information (CQI) in a mobile communication system, comprising:

an allocated resource checker for receiving uplink radio resource allocation information from a base station, and checking a radio resource set for the subscriber station by analyzing the allocation information;

a channel quality reporter for generating the CQI by measuring channel quality so as to communicate with the base station when the uplink radio resource allocation information includes a channel quality information indicator for requesting channel quality information;

an uplink data generator for generating uplink data to be transmitted to the base station, and adding the CQI to the uplink data; and a transmitter for transmitting the uplink data to the base station through a radio resource confirmed by the allocated resource checker, without requesting resource allocation to transmit the channel quality information, wherein the uplink data includes data to be transmitted, and a header having information for the data and the subscriber station, and wherein the uplink data is transmitted by adding a subheader including the CQI to the header of the uplink data.

14. The subscriber station of claim 13, wherein the uplink data includes data to be transmitted, and a header having information on the data and the subscriber station, and the uplink data generator adds a subheader including the channel quality information to the header of the uplink data.

* * * * *